US012619571B2

(12) United States Patent
Tal et al.

(10) Patent No.: US 12,619,571 B2
(45) Date of Patent: *May 5, 2026

(54) CRYPTOCURRENCY MINER AND DEVICE ENUMERATION

(71) Applicant: Chain Reaction Ltd., Yokneam (IL)

(72) Inventors: Michael Tal, Yoqneam Illit (IL); Gil Shefer, Haifa (IL); Rony Gutierrez, Pardes Hanna-Karkur (IL)

(73) Assignee: Chain Reaction Ltd., Yokneam (IL)

(*) Notice: Subject to any disclaimer, the term of this patent is extended or adjusted under 35 U.S.C. 154(b) by 32 days.

This patent is subject to a terminal disclaimer.

(21) Appl. No.: 18/675,645

(22) Filed: May 28, 2024

(65) Prior Publication Data

US 2024/0311329 A1      Sep. 19, 2024

Related U.S. Application Data

(63) Continuation of application No. 17/837,810, filed on Jun. 10, 2022, now Pat. No. 12,026,119.

(51) Int. Cl.
*G06F 13/42* (2006.01)
*G06Q 40/04* (2012.01)
*H04L 9/06* (2006.01)

(52) U.S. Cl.
CPC ......... *G06F 13/4282* (2013.01); *G06Q 40/04* (2013.01); *H04L 9/0643* (2013.01); *G06F 2213/0002* (2013.01)

(58) Field of Classification Search
CPC ........ G06F 13/4282; G06F 2213/0002; G06Q 40/04; H04L 9/0643
See application file for complete search history.

(56) References Cited

U.S. PATENT DOCUMENTS

| | | | |
|---|---|---|---|
| 11,609,624 B1 | 3/2023 | Wade | |
| 2010/0122003 A1* | 5/2010 | Hu | H04B 10/65 |
| | | | 710/110 |
| 2011/0131370 A1* | 6/2011 | Vogt | G06F 12/00 |
| | | | 711/E12.078 |
| 2012/0221705 A1 | 8/2012 | Pettey | |

(Continued)

FOREIGN PATENT DOCUMENTS

WO        2015077378 A1     5/2015

OTHER PUBLICATIONS

"AsicBoost—A Speedup for Bitcoin Mining", Dr. Timo Hanke, Mar. 31, 2016, 10 pages.

(Continued)

*Primary Examiner* — Henry Tsai
*Assistant Examiner* — Harry Z Wang
(74) *Attorney, Agent, or Firm* — McAndrews, Held & Malloy, Ltd.

(57) ABSTRACT

A cryptocurrency miner includes a serial bus, compute modules, and a controller. Each compute module includes upstream ports, downstream ports, a pass-through buffer coupling the upstream ports to the downstream ports, and a serial bus interface coupled to the serial bus via the first upstream ports and the first downstream ports. The controller controls operation of the compute modules via commands on the serial bus. The serial bus includes bus segments between respective upstream and downstream ports of the compute modules.

17 Claims, 8 Drawing Sheets

(56) References Cited

U.S. PATENT DOCUMENTS

| | | | |
|---|---|---|---|
| 2012/0243559 A1* | 9/2012 | Pan | H04J 3/1605 370/503 |
| 2013/0297829 A1* | 11/2013 | Berenbaum | G06F 13/4256 710/36 |
| 2016/0112200 A1 | 4/2016 | Kheterpal et al. | |
| 2016/0164672 A1 | 6/2016 | Karighattam et al. | |
| 2016/0205066 A1* | 7/2016 | Attarwala | H04L 61/5038 709/208 |
| 2018/0143940 A1* | 5/2018 | Shenton | G06F 15/8023 |
| 2019/0108498 A1 | 4/2019 | Deshpande et al. | |
| 2021/0203704 A1 | 7/2021 | Pohl | |
| 2022/0271753 A1 | 8/2022 | Xue et al. | |

OTHER PUBLICATIONS

"Crypto Mining: Network Difficulty, Share Difficulty and Hash Functions", Luxor Tech, Feb. 20, 2020, 6 pages.

"Mastering Bitcoin", Andreas M. Antonopoulos, Published by O'Reilly Media, Inc. 2010, 87 pages.

Federal Information Processing Standards Publication, Aug. 2015, 36 pages.

"Optimising the SHA256 Hashing Algorithm for Faster and More Efficient Bitcoin Mining", Rahul P. Naik, Department of Computer Science, University College of London, Sep. 2, 2013, 65 pages.

BitmainAntminer—Youtube video, https://www.youtube.com/watch?v=_R36wWMM34M.

MicroBT Whatsmainer—Youtube video, https://www.youtube.com/watch?v=6vtq1m8w5eQ.

SHA-256 The Center of Bitcoin—Andreas M. Antonopoulos—Youtube video, https://www.youtube.com/watch?v=TvqDbLnsSNs.

"Goldstrike 1: Cointerra's first-generation cryptocurrency mining processor for bitcoin." IEEE micro 35.2 (2015):68-76; Retrieved from the Internet :<URL: https:llieeexplore.ieee.org/abstract/document/7045415>Barkatullah, Javed and Timo Hanke Feb. 19, 2015 (Feb. 19, 2015), 9 pages.

International Search Report and Written Opinion for Application No. PCTIIB2023/055836, mailed Sep. 21, 2023, 12 pages.

* cited by examiner

| DevID<br>16 bits | Rsvd<br>4 bits | Opcode<br>4 bits | Command Data<br>Variable # bits | CRC<br>16 bits |
| --- | --- | --- | --- | --- |

CRYPTOCURRENCY MINER AND DEVICE ENUMERATION

CROSS-REFERENCE TO RELATED APPLICATIONS

This application is a continuation of U.S. patent application Ser. No. 17/837,810, filed Jun. 10, 2022, the disclosure of which is hereby incorporated herein by reference in its entirety.

BACKGROUND

Cryptocurrency is a digital asset designed to work as a medium of exchange. Individual coin ownership records are stored in a ledger or blockchain. Unlike conventional currencies, cryptocurrency does not typically exist in a physical form and is typically not issued by a central authority.

A blockchain provides a continuously growing list of records, called blocks, which are linked and secured using cryptography. Each block typically contains a hash pointer as a link to a previous block, a timestamp, and transaction data. By design, blockchains are inherently resistant to modification of the data. A blockchain is typically managed by a peer-to-peer network collectively adhering to a protocol for validating new blocks. Once recorded, the data in any given block cannot be altered retroactively without the alteration of all subsequent blocks, which requires collusion of the network majority.

In cryptocurrency networks, miners validate cryptocurrency transactions of a new candidate block for the blockchain via a Proof-of-Work algorithm. A side effect of validating the candidate block is the creation of newly minted cryptocurrency. The newly minted cryptocurrency as well as associated service fees are awarded to the miner that was the first miner to validate the candidate block and thus complete the Proof-of-Work algorithm.

This winner-takes-all compensation scheme has created an arms race for more efficient miners. Furthermore, mining pools have developed in an attempt to lessen the risks associated with the winner-takes-all compensation scheme. Miners or members of a mining pool share their processing power and split any obtained reward among the members according to the amount of work they contributed.

Limitations and disadvantages of conventional and traditional cryptocurrency mining approaches will become apparent to one of skill in the art, through comparison of such approaches with the present disclosure as set forth in the remainder of the present disclosure with reference to the drawings.

SUMMARY

Figure 1:
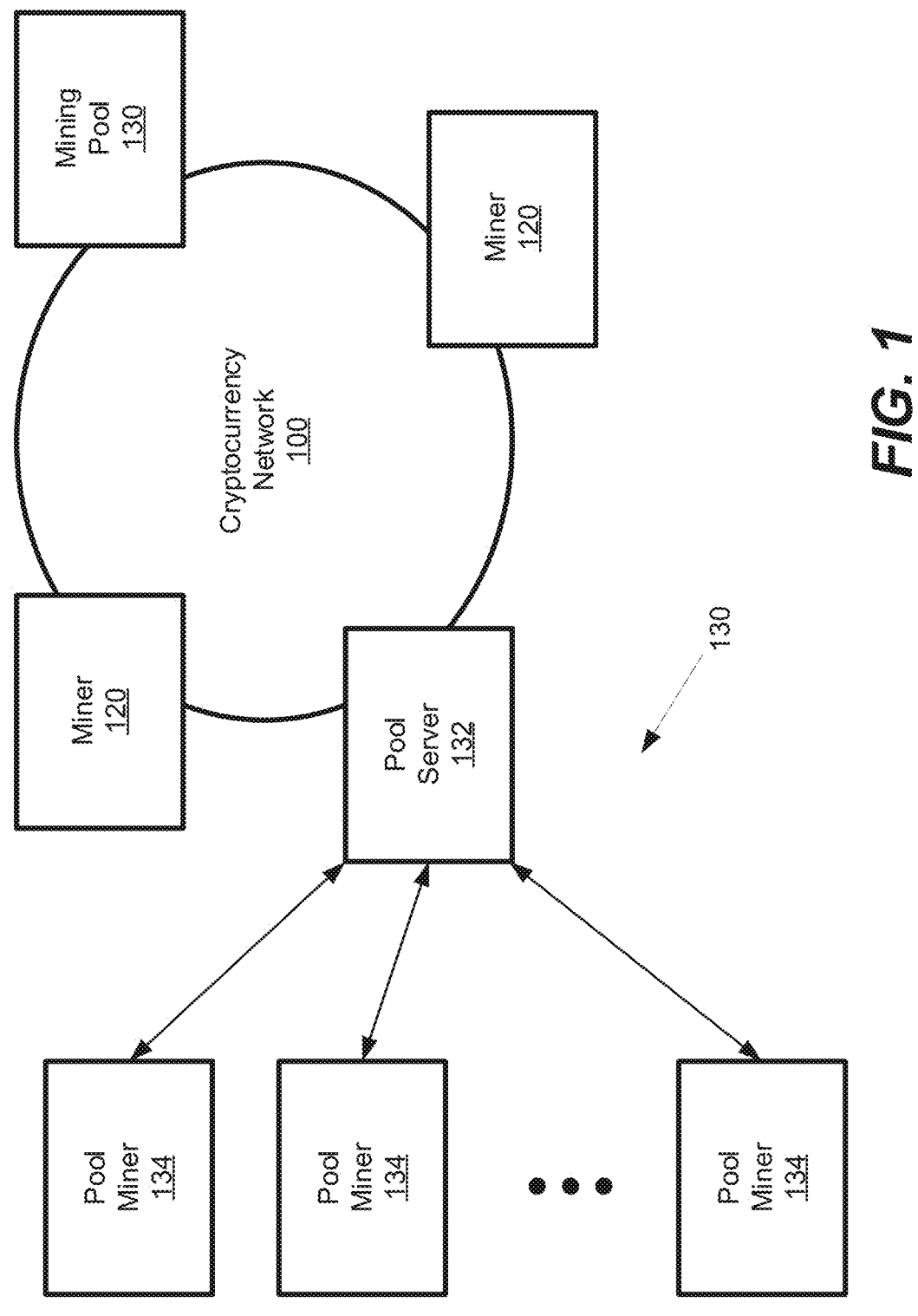
FIG. 1 shows a cryptocurrency network comprising miners in accordance with various aspects of the present disclosure.

Cryptocurrency miners and associated methods and apparatus are substantially shown in and/or described in connection with at least one of the figures, and are set forth more completely in the claims.

Advantages, aspects, and novel features of the present disclosure, as well as details of illustrated embodiments, will be more fully understood from the following description and drawings.

DETAILED DESCRIPTION OF VARIOUS ASPECTS OF THE DISCLOSURE

Various aspects of the present disclosure are presented by way of example. Such examples are non-limiting, and thus the scope of various aspects of the present disclosure should not necessarily be limited by any particular characteristics of the provided examples. In the following, the phrases "for example," "e.g.," and "exemplary" are non-limiting and are generally synonymous with "by way of example and not limitation," "for example and not limitation," and the like.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z."

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section could be termed a second element, a second component, or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a component may be turned sideways so that its "top" surface is facing horizontally and its "side" surface is facing vertically, without departing from the teachings of the present disclosure.

In the drawings, various dimensions (e.g., thicknesses, widths, lengths, etc.) may be exaggerated for illustrative clarity. Additionally, like reference numbers are utilized to refer to like elements through the discussions of various examples.

The discussion will now refer to various example illustrations provided to enhance the understanding of the various aspects of the present disclosure. It should be understood that the scope of this disclosure is not limited by the specific characteristics of the examples provided and discussed herein.

Referring now to FIG. 1, an embodiment of a cryptocurrency network 100 is shown. In particular, the cryptocurrency network 100 may be implemented as a Bitcoin network. The present disclosure focuses primarily upon Bitcoin and the Bitcoin network. However, aspects of the present disclosure are also applicable to other cryptocurrencies, also referred to as Altcoin, such as, for example, Litecoin, Dogecoin, Ethereum, etc. and their respective networks. Similarly, the present disclosure focuses primarily on aspects of mining pool miners that are members of a Bitcoin mining pool. However, aspects of the present disclosure are also applicable to standalone miners, distributed miners, and/or mining pool miners of Bitcoin and/or Altcoin networks.

As shown, the cryptocurrency network 100 may include multiple miners 120 (e.g., standalone miners and/or distributed miners) and multiple mining pools 130, which are operably coupled to one another via various networks such as LANs, WANs, cellular, satellite, and/or communication networks. The miners 120 and mining pools 130 of the cryptocurrency network compete with each other in a decentralized manner to create a new block of processed Bitcoin transactions (e.g., transfers of Bitcoin between parties), and add the newly created block to the blockchain for the cryptocurrency network 100.

The blockchain is essentially a growing list or ledger of cryptographically linked records of transactions called blocks. Each block includes a cryptographic hash of the previous block, a timestamp, transaction data, and potentially other fields. The blocks form a chain, with each additional block reinforcing the ones before it. As such, blockchains are resistant to modification because any given block cannot be altered retroactively without altering all subsequent blocks.

The creation of a new block is designed to be computationally intensive so as to require the cryptocurrency network 100 to spend a specified amount of time on average to create a new block. For example, the Bitcoin network is designed to create and add a new block to the blockchain every 10 minutes on average. The cryptocurrency network 100 periodically adjusts the computational difficulty of creating a new block to maintain the 10 minute target. In this manner, the cryptocurrency network 100 may create new blocks in a relatively steady manner despite ever changing computational capacity. For example, adding new miners 120, mining pool miners 134, and/or mining pools 130 to the cryptocurrency network 100 increases the overall computational capacity of the cryptocurrency network 100. Such increased computational capacity reduces the time required to create and add a new block to blockchain. However, the cryptocurrency network 100 periodically adjusts the computational difficulty of creating a new block to maintain the 10 minute target. As a result, the cryptocurrency network 100 eventually detects that blocks are being created at a rate faster than the 10 minute target and appropriately increases the difficulty of creating a new block so as to counteract the increased computational capacity and maintain the roughly 10 minutes per block average.

To incentivize parties to undertake the computationally difficult task of generating a new block, the cryptocurrency network 100 compensates the miners 120 and mining pools 130 for their efforts. In particular, each new block generates a quantity of new currency (e.g., 6.25 Bitcoins) as well as service fees from all transactions in the block. These new coins and service fees are awarded to the first entity (e.g., miner 120 or mining pool 130) that solves the Proof-of-Work algorithm for the next block to be added to the blockchain. The Proof-of-Work algorithm is essentially a computationally intensive process that creates a new block that satisfies a cryptographic hash target. Thus, the miners 120 and mining pools 130 are in competition with one another since only the first entity to solve the Proof-of-Work algorithm receives the associated block award.

Given the all or nothing nature of the block awards, mining pools 130 have formed. In general, a mining pool 130 includes a pool server 132 and several mining pool miners or members 134. The pool server 132 divides the Proof-of-Work into substantially smaller jobs and distributes such smaller jobs to the mining pool miners 134 in the mining pool 130. By completing smaller jobs, mining pool miners 134 obtain shares of a block award won by the mining pool 130. In this manner, each of the mining pool miners 134 may earn a smaller award (e.g., a share of a block award proportional to their contribution to completing the Proof-of-Work) on a more frequent basis than if each of the mining pool miners 134 were operating as a miner 120 on its own.

Figure 2:
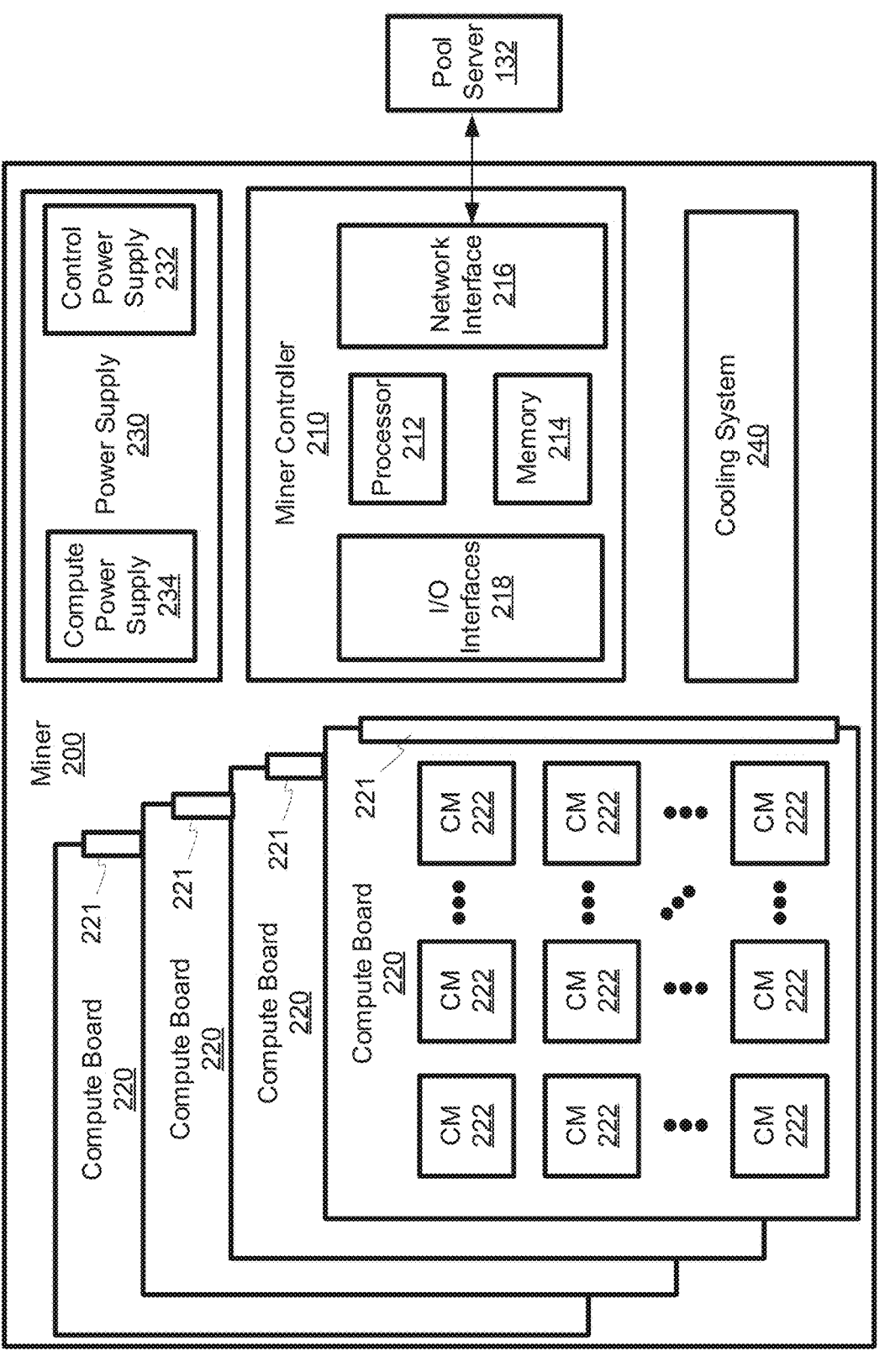
FIG. 2 shows a block diagram of a miner of FIG. 1.

A block diagram of a miner 200 is shown in FIG. 2, which is suitable for implementing one of the mining pool miners 134 of the mining pool 130. As shown, the miner 200 includes a miner controller 210, compute boards 220, a power supply 230, and a cooling system 240.

The miner controller 210 generally manages the components of the miner 200. In particular, the miner controller 210 interacts with pool server 132 on the behalf of the compute boards 220. To this end, the miner controller 210 obtains jobs from the pool server 132, distributes the jobs to the compute boards 220, and submits Proof-of-Work to the pool server 132 for the jobs completed by the compute boards 220.

As shown, the miner controller 210 may include a processor 212, memory 214, a network interface 216, and various input/output (I/O) interfaces 218. The processor 212 may be configured to execute instructions, manipulate data, and generally control operation of the other components of the miner 200 as a result of its execution. To this end, the processor 212 may include a general-purpose processor such as an x86 processor or an ARM processor, which are available from various vendors. However, the processor 212 may also be implemented using an application specific processor, programmable gate arrays, and/or other logic circuitry.

The memory 214 may store instructions and/or data to be executed and/or otherwise accessed by the processor 212. In some embodiments, the memory 214 may be completely and/or partially integrated with the processor 212. The memory 214 may store software and/or firmware instructions, which may be executed by processor 212. The memory 214 may further store various types of data which the processor 212 may access, modify, and/or otherwise manipulate in response to executing instructions from memory 214. To this end, the memory 214 may comprise volatile and/or non-volatile storage devices such as randomaccess memory (RAM) devices, read only memory (ROM) devices, flash memory devices, solid state device (SSD) drives, etc.

The network interface 216 may enable the miner 200 to communicate with other computing devices such as the pool server 132. In particular, the network interface 216 may permit the processor 212 to obtain jobs from the pool server 132 and submit completed jobs to the pool server 132. To this end, the networking interface 216 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, 5G, etc.), and/or some other type of networking interface capable of providing a communications link between the miner 200 and other devices such as the pool server 132.

Finally, the I/O interfaces 218 may generally provide communications and control paths between the processor 212 and other components of the miner 200 such as the compute boards 220, power supply 230, and cooling system 240. Via such interfaces, the processor 212 may control the operation of such components. For example, the processor 212 may use such I/O interfaces 218 to initialize the compute boards 220, distribute jobs to the compute boards 220, receive completed jobs from the compute boards 220, selectively enable/disable the power supply 230, and selectively turn on/off cooling system 240, among other things.

In various embodiments, the one or more I/O interfaces 218 include communication interfaces such as a Serial Peripheral Interface (SPI) interface and/or an Inter-Integrated Circuit (I2C) interface via which the processor 212 may communicate with the compute boards 220. In particular, each compute board 220 may include a board connector and/or communication interface 221. A bus such as, for example, a four-wire SPI serial bus may connect the compute modules 222 of the compute boards 220 to the miner controller 210 via the board connector 221 and their respective interfaces. In such an embodiment, the miner controller 210 and compute modules 222 may operate in a master-slave arrangement, wherein the miner controller 210 acts as the single master of the bus and each of the compute modules 222 operate as slaves on the bus. In such embodiments, the miner controller 210 may assign jobs to the compute modules 222 and the compute modules 222 may push completed jobs to the miner controller 210 upon completion. In various embodiments, the miner controller 210 and compute modules 222 may utilize an SPI interface and associated SPI bus segments to communicate. However, other interconnect technologies may be used in other embodiments.

Each compute board 220 may include a board connector 221 and several compute modules 222 coupled to the board connector 221 via one or more bus segments. Each compute module 222, likewise, may include several compute engines that perform computational aspects of completing a job. In one embodiment, each compute module 222 is implemented via an application specific integrated circuit (ASIC). However, the compute modules 222 and their respective compute engines may be provided by other forms of circuitry such as field programmable gate arrays (FPGAs).

In one embodiment, a miner 200 includes 4 compute boards, each compute board 220 includes 28 compute modules 222, and each compute module 222 includes 12 compute engines. Such a miner 200 thus provides 1,344 (4×28× 12) compute engines. The above quantities of compute boards 220, compute modules 222, and compute engines were provided merely for context. Other embodiments of the miner 200 may include different quantities of such components.

Per the Bitcoin standard, a candidate block header must have a message digest or hash value that satisfies a current target value in order to be deemed a valid block header suitable for adding to the blockchain. Such a message digest is computed per a double SHA-256 hash of the block header. Specifically, a compute engine generates a double SHA-256 hash of a candidate block header by computing a first message digest or hash value of the candidate block header per the SHA-256 algorithm specified by Federal Information Processing Standards Publication 180-4 (FIPS Pub. 180-4). The compute engine then computes a second message digest or final hash value of the candidate block header by performing a SHA-256 hash of the first message digest. Thus, the compute engine performs a double hash of the candidate block header to determine whether its double hash value satisfies a target value and is therefore a valid block header. Thus, for Bitcoin and various Altcoin embodiments of the miner 200, the compute boards 220 may also be referred to as hashing boards 220 since the compute engines perform various hashing functions and/or various cryptographic algorithms addressing a similar goal as such hashing functions.

While Bitcoin and some other cryptocurrencies utilize the SHA-256 hashing algorithm as part of their Proof-of-Work algorithms, other cryptocurrencies may use other cryptographic and/or hashing algorithms as part of their Proof-of-Work algorithm. For example, Litecoin and Dogecoin use the scrypt key-derivation function and Ethereum uses the Ethash algorithm. Thus, for embodiments of the miner 200 designed to mine such Altcoins, the compute boards 220 may include compute modules 222 designed to compute these other cryptographic algorithms.

The power supply 230 generally converts alternating current (AC) voltage to a direct current (DC) voltage suitable for the compute boards 220 and other components of the miner 200. In one embodiment, the power supply 230 receives 220V AC voltage from, for example, a wall mains outlet and efficiently converts the received power to one or more DC voltages distributed to various components of the miner 200. As shown, the power supply 230 may include a control power supply 232, one or more compute power supplies 234, as well as other power supplies. The control power supply 232 may supply control power (e.g., via one or more supplied DC voltages) used to power a control power domain of the compute boards 220. The one or more compute power supplies 234 may supply compute power (e.g., via one or more supplied DC voltages) used to power a compute power domain of the compute boards 220.

In one embodiment, the control power supply 232 and compute power supply 234 are selectively enabled via one or more signals of the miner controller 210. As such, the miner controller 210 may selectively enable/disable the power supplies 232, 234 so as to selectively power-up/ power-down the respective power domains of the compute boards 220. For example, the miner controller 210 may power-up the control power domain of the compute boards 220 in order to configure and confirm operation of the compute boards 220 before powering-up the compute domain, which in certain embodiments consumes substantially more power than the control power domain.

The cooling system 240 generally comprises active thermal components (e.g., cooling fans, liquid cooling systems, Peltier cooling modules, etc.) that aid in maintaining the other components of the miner 200, especially the compute boards 220, within a thermal envelope associated with high operating efficiency. Beyond the active thermal components of the cooling system 240, the miner 200 may include other passive thermal components such as heat sinks, heat pipes, thermal paste, etc. that further aid in maintaining the components of the miner 200 within the desired thermal envelope.

Figure 3:
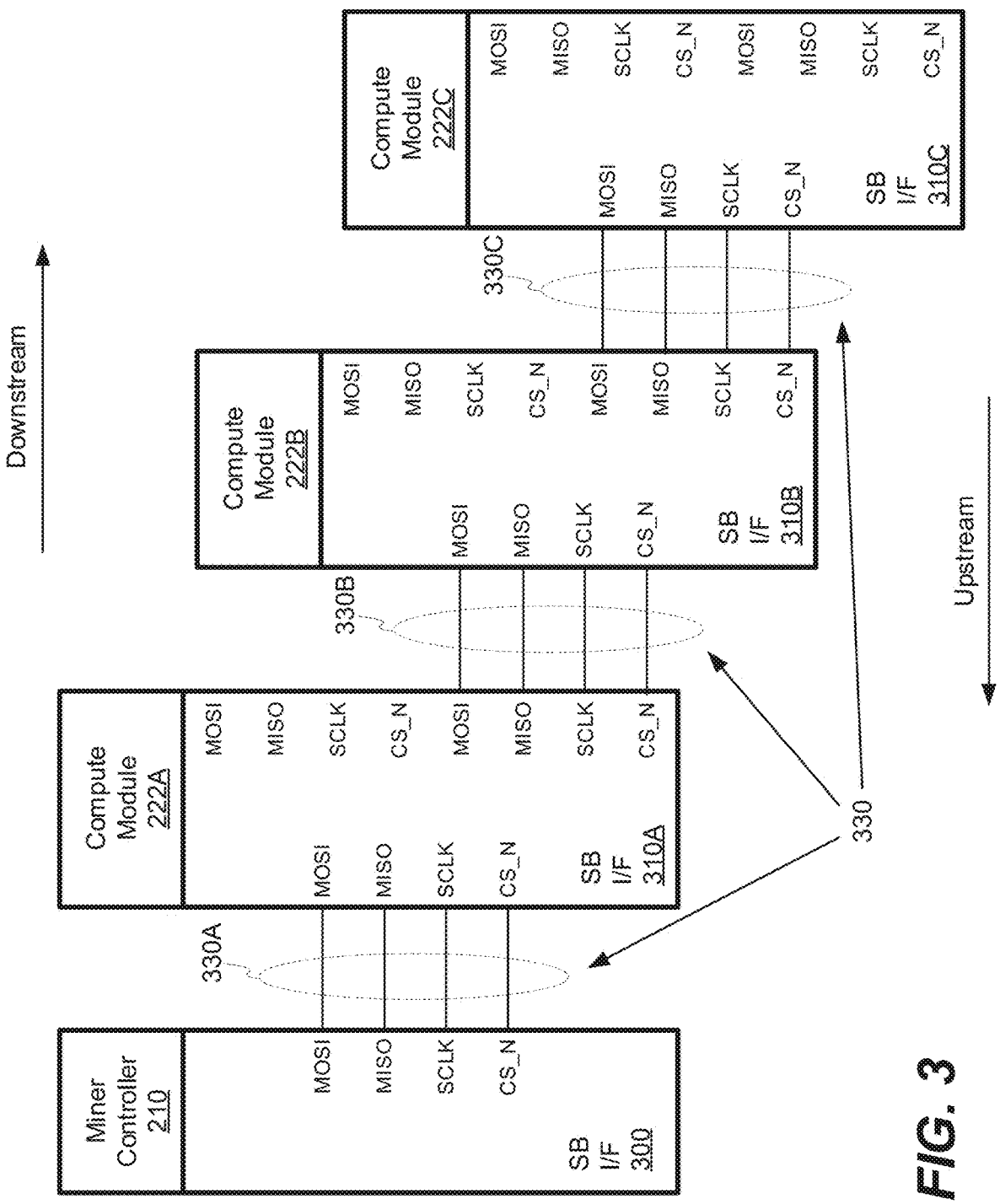
FIG. 3 shows the miner controller of FIG. 2 coupled to compute modules via a serial bus.

Referring now to FIG. 3, a master-slave topology of the miner controller 210 and compute modules 222A-222C is depicted. In particular, the I/O interfaces 218 of the miner controller 210 may include a serial bus interface 300 that is operatively coupled to serial bus interfaces 310A-310C of the compute modules 222A-222C via a serial bus 330. In various embodiments, the serial bus interface 300 of the miner controller 210 includes a master interface controller (e.g., a SPI master interface controller), each serial bus interface 310A-310C of the compute modules 222A-222C includes a slave interface controller (e.g., a SPI slave interface controller), and the serial bus 330 includes one or more serial bus segments (e.g., SPI four-wire bus segments). As such, the miner controller 210 may communicate with the compute modules 222 via a serial bus protocol (e.g., a SPI protocol) over the one or more serial bus segments. However, while an embodiment of the depicted topology generally aligns with conventional SPI communications, the depicted topology is non-conventional, especially with regard to at least the below-discussed pass-through buffers, signal pass-through, and addressing schemes.

As shown, the serial bus interface 300 of the miner controller 210 includes a downstream Master Output Slave Input (MOSI) port, a downstream Master Input Slave Output (MISO) port, a downstream Serial Clock (SCLK) port, and a downstream Chip Select (CS_N) port. Each serial bus interface 310A-310C of the compute modules 222A-222C includes an upstream MOSI port, an upstream MISO port, an upstream SCLK port, and an upstream CS_N port. Furthermore, each serial bus interface 310A-310C of the compute modules 222A-222C includes one or more sets of downstream ports, where each set of downstream ports includes a downstream MISO port, a downstream SCLK port, and a downstream CS_N port.

A bus segment 330A of the serial bus 330 respectively couples downstream MOSI, MISO, SCLK, and CS_N ports of the miner controller 210 to respective upstream MOSI, MISO, SCLK, and CS_N ports of the compute module 222A. Similarly, bus segment 330B of the serial bus 330 respectively couples a set of downstream MOSI, MISO, SCLK, and CS_N ports of the compute module 222A to respective upstream MOSI, MISO, SCLK, and CS_N ports of the compute module 222B. Likewise, bus segment 330C of the serial bus 330 respectively couples a set of downstream MOSI, MISO, SCLK, and CS_N ports of the compute modules 222B to respective upstream ports of the compute module 222C. With the compute module 222C being the last slave device in the chain, its downstream MOSI, MISO, SCLK, and CS_N ports are not coupled to the serial bus 330.

Depending on the implementation of pass-through buffers of the serial bus interfaces 310A-310C, one or more of downstream MOSI, MISO, SCLK, and CS_N ports that are not coupled to a downstream device may be pulled high, may be pulled low, or otherwise terminated to ensure proper operation and signal integrity of the serial bus 330. For example, in one embodiment, downstream MISO ports that are not connected to downstream devices are pulled to a logical low value to ensure its respective pass-through buffer properly drives the upstream MISO port.

Each bus segment 330A-330C may include a MOSI line, a MISO line, CS_N line, and a SCLK line coupled to respective ports of the miner controller 210 and compute modules 222A-222C. For the sake of clarity, only three compute modules 222A-222C are depicted in FIG. 3. However, embodiments of the miner 200 are likely to include more than three compute modules 222 (e.g., 28 compute modules). In such embodiments, additional compute modules 222 may be added to the topology shown in FIG. 3 by continuing the depicted chain of devices from compute module 222C.

In one embodiment, the serial bus interface 300 of the miner controller 210 assumes the master role for the serial bus 330. As such, the serial bus interface 300 drives a serial clock signal on the SCLK line of the bus 330 via its SCLK port. The serial bus interface 300 may further drive a downstream MOSI data signal on the MOSI line of the bus 330 via its MOSI port such that the MOSI data signal is synchronized to the serial clock signal on the bus 330. In various embodiments, the serial bus interface 300 drives a downstream MOSI data signal on the MOSI line regardless of whether the miner controller 210 has data to send to the slave devices 310A-310C. For example, if miner controller 210 has no data to send, the serial bus interface 300 drives the MOSI line with a downstream MOSI data signal that represents a logical low or logical zero value.

Each serial bus interface 310A-310C of the compute modules 222A-222C receives the serial clock signal via its respective upstream SCLK port and propagates the received serial clock signal to downstream devices by driving the received serial clock signal on its respective downstream SCLK port. Moreover, each serial bus interface 310A-310C receives a MOSI data signal via its respective upstream MOSI port and propagates the received MOSI data signal to downstream devices by driving the received MOSI data signal on its respective downstream MOSI port.

Conversely, each serial bus interface 310A-310C of the compute modules 222A-222C receives a MISO data signal via its respective downstream MISO port. Each serial bus interface 310A-310C may aggregate the MISO data signals received via its respective downstream MISO port with data to be sent by the respective compute module 222A-222C and propagate the resulting aggregate MISO signal to upstream devices via its upstream MISO port. In various embodiments, each compute module 222A-222B provides a MISO data signal regardless of whether the compute module 222A-222B has data to send to the miner controller 210. For example, if a compute module 222 has no data to send, the compute module 222 provides a MISO data signal that represents a logical low or logical zero value.

Figure 4:
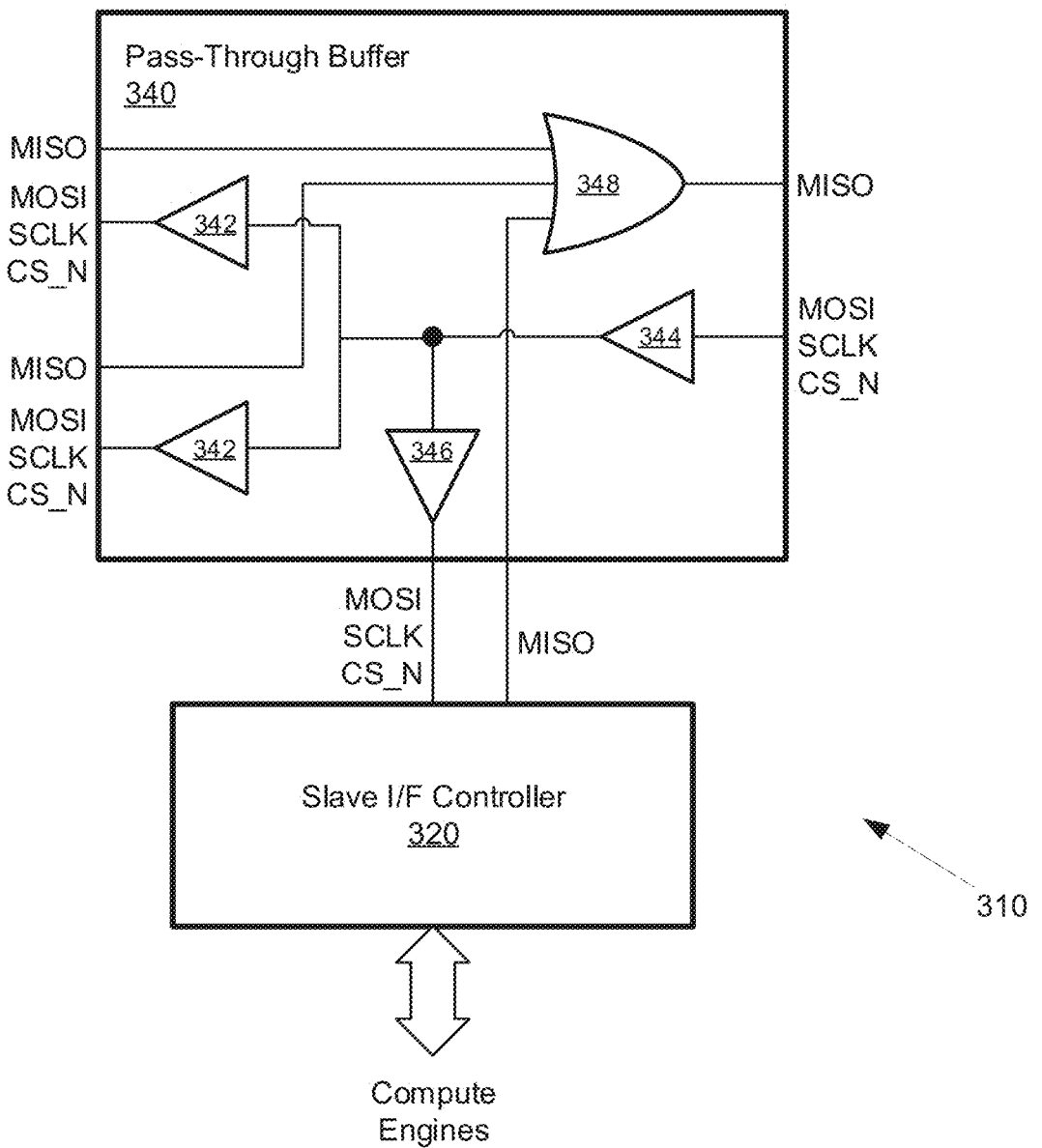
FIG. 4 shows a pass-through buffer of a compute module from FIG. 2.

Referring now to FIG. 4, a serial bus interface 310 suitable for implementing the serial bus interfaces 310A-310C of the compute modules 222A-222C is shown. The serial bus interface 310 may include a slave interface controller 320 coupled to pass-through buffers 340. The slave interface controller 320 may include shift registers, state machines, and/or other control logic for sending and/or receiving data signals via the pass-through buffers 340 on behalf of other components (e.g., compute engines) of the respective compute module 222A-222C.

The pass-through buffers 340 are coupled to the upstream and downstream MOSI, MISO, SCLK, and CS_N ports of the serial bus interface 310 in order to receive signals from respective MOSI, MISO, SCLK, and CS_N lines and appropriately propagate such received signals to upstream and/or downstream devices. To this end, the pass-through buffers 340 may include one or more downstream buffers 342 (two depicted), an upstream buffer 344, a controller buffer 346, and a logic gate 348. Inputs of the upstream buffer 344 are coupled to upstream MOSI, SCLK, and CS_N ports of the serial bus interface 310. Outputs of the upstream buffer 344 are coupled to inputs of each downstream buffer 342 and to inputs of the controller buffer 346. Outputs of the controller buffer 346 are coupled to MOSI, SCLK, and CS_N inputs of the slave interface controller 320. Moreover, outputs of each downstream buffer 342 are coupled to a respective set of downstream MOSI, SCLK, and CS_N ports of the serial bus interface 310. As such, the upstream buffer 344 drives the downstream buffers 342 and the controller buffer 346 based on signals received via the upstream MOSI, SCLK, and CS_N ports. Likewise, the controller buffer 346 drives MOSI, SCLK, and CS_N inputs of the slave interface controller 320 based on signals received from the upstream buffer 344. Moreover, each downstream buffer 342 drives its respective set of downstream MOSI, SCLK, and CS_N ports based on signals received from the upstream buffer 344. In this manner, signals received via the upstream MOSI, SCLK, and CS_N ports are received by the slave interface controller 320 and propagated through the serial bus interface 310 to downstream devices.

Inputs of the logic gate 348 are coupled to each of the downstream MISO ports and to MISO output of the slave interface controller 320. Moreover, an output of the logic gate 348 is coupled to the upstream MISO port of the serial bus interface 310. In one embodiment, the logic gate 348 comprises an OR gate, which aggregates data signals from downstream devices and generates an aggregate data signal representative of the received data signals. More specifically, the logic gate 348 may perform a logical-OR operation of its inputs and drive the upstream MISO port with an aggregate data signal representative of the resulting logical-OR operation of its inputs. In one embodiment, the slave interface controller 320 drives its upstream MISO output with a data signal representative of a logical low or logical zero value when it has no data to send. As such, the logical-OR gate 348 effectively ignores the data signal of slave interface controllers 320 without data to send and drives the upstream MISO port based on the logical values of its other inputs. In this manner, MISO data signals may propagate upstream through the serial bus interfaces 310 of compute modules 222 whose slave interface controllers 320 have no data or are otherwise not sending data upstream.

Finally, the miner controller 210 via an I2C interface of its I/O interfaces 218 may selectively enable/disable the pass-through buffers 340. As explained in greater detail below, the miner controller 210 may utilize such selective enabling/disabling of the pass-through buffers 340 to open serial bus paths or segments as part of an enumeration process that assigns addresses to the compute modules 222. In some embodiments, ports of the pass-through buffers 340 are placed in a reset state when disabled. For example, when disabled, the downstream CS_N ports may be placed at a logical high or logical zero value to deselect downstream compute modules 222. The downstream SCLK ports may be placed at a logical low or logical zero value to prevent clocking of downstream compute modules 222. The downstream MISO port and the downstream MOSI ports may be placed at a logical low or logical zero value so as to not affect MISO data signals and MOSI data signals passing through other pass-through buffers 340. In some embodiments, the reset values may be provided via appropriate pull-up or pull-down resistors coupled to the respective ports.

Driving multiple devices, especially an amount of device populated on an example compute board 220 (e.g., 28 or more), requires large, power-inefficient driving buffers to provide the driving force needed. The pass-through buffers 340 address this issue. Both upstream and downstream signals are routed through the pass-through buffers 340 of the compute modules 222. As such, each buffer 342, 344, 346 of the pass-through buffers 340 drives a smaller number of devices (e.g., 2-4). Thus, the pass-through buffers 340 may be implemented with smaller, more power-efficient driving buffers and may reduce the overall power consumption compared to if fewer, but larger driving buffers were used.

Moreover, due to the pass-through buffers 340, the CS_N ports of the compute modules 222 are effectively tied together. As such, when the serial bus interface 300 of the miner controller 210 drives the CS_N signal to a logical low or logical zero value, the upstream CS_N ports of all serial bus interfaces 310 are likewise driven to logical low or a logical zero value and the respective compute modules selected. Thus, the serial bus interfaces 310 are selected/deselected together based on the CS_N signal. Accordingly, in various embodiments, the serial bus interface 300 does not use the CS_N signal in a conventional manner to individually select/deselect a unique compute module 222. Instead, the serial bus interface 300 utilizes the CS_N signal as a framing signal for commands sent from miner controller 210 to the compute modules 222 via the serial bus 330. Moreover, the serial bus interface 300 of the miner controller 210 utilizes a device identifier field DevID of the command to identify the destination of the command, which may be one or more compute modules 222.

Figures 5, 6:
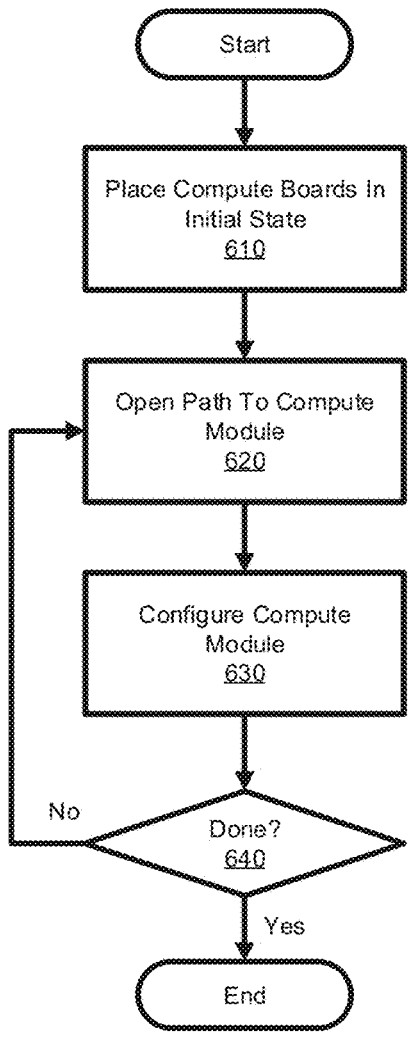
FIG. 5 shows an example command format used by the miner controller of FIG. 2.
FIG. 6 shows a flowchart for an example enumeration process used by the miner controller of FIG. 2.

A general format for such a command is shown in FIG. 5. In various embodiments, commands are 8-bit aligned to ease parsing and generation at a hardware and software level. As shown, the command may include a device identifier (DevID) field, a reserved (Rsvd) field, an opcode (Opcode) field, a command data (Command Data) field, and a cyclical redundancy check (CRC) field.

The DevID field comprises sixteen (16) bits and specifies a unicast or multicast address that identifies the destination of the command. As explained in more detail below, the destination of such commands is determined by a device identifier in the DevID field of the transmitted command. In various embodiments, each serial bus interface 310 of the compute modules 222 comprises a quantity (e.g., six (6)) of address registers that store addresses assigned to the respective serial bus interface 310 and its compute module 222, and each serial bus interface 310 and its compute module 222 accepts and processes any command that has a device identifier in its DevID field that matches one its assigned addresses. In various embodiments, all address registers have a predefined reset value (e.g., 0xffffffff) which represents an uninitialized address.

The Opcode field specifies an operation that the destination device or devices are to perform in response to the received command. In one embodiment, the Opcode field may specify one of a NOP operation, a WRITE_REG operation, a READ_REG operation, a MCAST_READ_REG operation, or a JOB_SUBMIT operation. The NOP operation results in the destination device performing no operation in response to the received command. The WRITE_REG operation results in the destination device writing a value specified by the Command Data field to a destination device register specified by the Command Data field. The READ_REG operation results in the destination device returning data read from a destination device register specified by the Command Data field. The MCAS-T_READ_REG operation results in multiple destination devices returning data read from respective destination device registers specified by the Command Data field. Finally, the JOB_SUBMIT operation submits a cryptographic job (e.g., a hashing job) to the destination device.

To support transferring such commands to the compute modules 222, the miner controller 210 may assign addresses to the compute modules 222 per an enumeration process. Per such an enumeration process, the miner controller 210 may assign a unique unicast address and one or more multicast addresses to the serial bus interface 310 of each compute modules 222. In particular, the miner controller 210 may assign a unique unicast address to each serial bus interface 310 and its compute module 222 and may assign a same multicast address to multiple serial bus interfaces 310 and their compute modules 222. After such address assignments, the miner controller 210 may send a command to a specific compute module 222 by populating the DevID field of the command with the unicast address that was uniquely assigned to its serial bus interface 310. Conversely, the miner controller 210 may simultaneously send a command to a group of compute modules 222 by using a multicast address that was assigned to each serial bus interface 310 in the group of compute modules 222.

With reference to FIG. 6, further details of an example enumeration process 600 are presented. In general, the miner controller 210 may perform the enumeration process 600 as part of a larger boot-up or power-on process of the miner 200. However, the enumeration process 600 may be performed in response to other events or processes such as testing, soft-reset, interface reset, error recover, etc.

At 610, the miner controller 210 may wait for the compute boards 220 to settle to an initial state. For example, the miner controller 210 may wait for power supplies, oscillators, interfaces, ASICs, etc., of the compute boards 220 to appropriately power-up and stabilize before proceeding with the enumeration process 600. In some embodiments, the miner controller 210 may perform various actions to ensure the compute boards 220 and their components are in an appropriate initial state before proceeding. For example, the miner controller 210 may enable and disable discrete buffers 341 (See, e.g., FIG. 8) and pass-through buffers 340. Such toggling of the buffers 340, 341 may ensure the buffers 340, 341 are in a known, disabled state before proceeding. Moreover, as noted above, each of the serial bus interfaces 310 of the compute modules 222 has a quantity (e.g., six (6)) of address registers that store addresses assigned to the respective serial bus interface 310 and each of the address registers has a predefined reset value (e.g., 0xffffffff), which represents an uninitialized address. Thus, in one embodiment, the initial state ensures that not only are the pass-through buffers 340 disabled but the address registers of each serial bus interface 310 have the predetermined uninitialized address (e.g., 0xffffffff).

After the compute boards 220 reach the initial state, the miner controller 210 at 620 may open a path to a first compute module 222. In particular, the miner controller 210 may open a path to the first compute module 222 by enabling one or more buffers 340, 341 via the I2C interface of the miner controller 210.

At 630, the miner controller 210 may configure the first compute module 222. In particular, the miner controller 210 may assign addresses to the compute module 222 and update the compute module 222 with the assigned addresses. To this end, the miner controller 210 may send a write register command on the serial bus 330 via the serial bus interface

300 of the miner controller 210. Such write register command may include the WRITE_REG Opcode in the Opcode field and the predefined reset value (e.g., 0xffffffff) in the DevID field. Moreover, the Command Data field of the write register command may specify a respective unicast address or multicast address for each address register of the compute module 222.

Since at least one of its addresses matches the predefined reset value in the DevID field, the serial bus interface 310 and/or its compute module 222 recognizes that it is a destination for the write register command and thus performs the specified write register operation. For example, in one embodiment, the serial bus interface 310 and/or its compute module 222 as a result of performing the write register command may set one (1) address register to a unicast address (e.g., 0x1000000) supplied by the Command Data field and may set the other address registers to a same multicast address (e.g., 0xfffffffe) supplied by the Command Data field. However, the Command Data field may specify more than one unicast address and/or more than one multicast address so as to assign more than one unicast address and/or more than one multicast address to the compute module 222. Moreover, since the miner controller 210 in various embodiments uses the predefined reset value (e.g., 0xffffffff) to address and enumerate subsequent compute modules 222, the miner controller 210 sends a write register command that ensures all address registers for the respective compute module 222 are set to a value that is not the predefined reset value. Finally, while the above describes assigning addresses via a single write register command, the miner controller 210 may issue to a particular compute module 222 multiple write register commands that collectively assign a unicast address or a multicast to each address register of the compute module 222.

After setting all address registers of the compute module 222 associated with the opened path, the miner controller 210 may determine at 640 whether enumeration of the compute modules 222 is complete. In some embodiments, the miner controller 210 may simply iterate through and enable all possible serial bus paths or segments and determine that the enumeration is complete after all possible serial bus paths or segments have been enabled. In other embodiments, the miner controller 210 may be configured with an ordered list of identifiers for pass-through buffers 340 and discrete buffers 341 and may determine that enumeration is complete after the last buffer 340, 341 in the ordered list has been enabled and the associated path opened.

If the miner controller 210 determines that enumeration is not complete, the miner controller 210 may return to 620 to open a path to a next compute module 222. Otherwise, the enumeration process is complete as each serial bus interface 310 for the compute modules 222 has been assigned one or more unicast addresses and/or one or more multicast addresses.

To provide further clarity to the enumeration process 600, reference is made to FIGS. 7A-7D which depict an example application of the enumeration process 600 to a network of slave devices 710A-710D (e.g., compute modules 222). As shown, slave devices 710A-710D may be arranged in a tree topology in which the root of the tree is coupled to a master device 700 (e.g., miner controller 210) via an integrated buffer 341 of the master device 700. In some embodiments, the depicted buffer 341 may be implemented via one or more discrete components external to the master device 700. Furthermore, while the tree topology of FIGS. 7A-7D provides a binary tree topology, other tree topologies are contemplated and supported. See, e.g., the non-binary tree topology of FIG. 8.

Figure 7A:
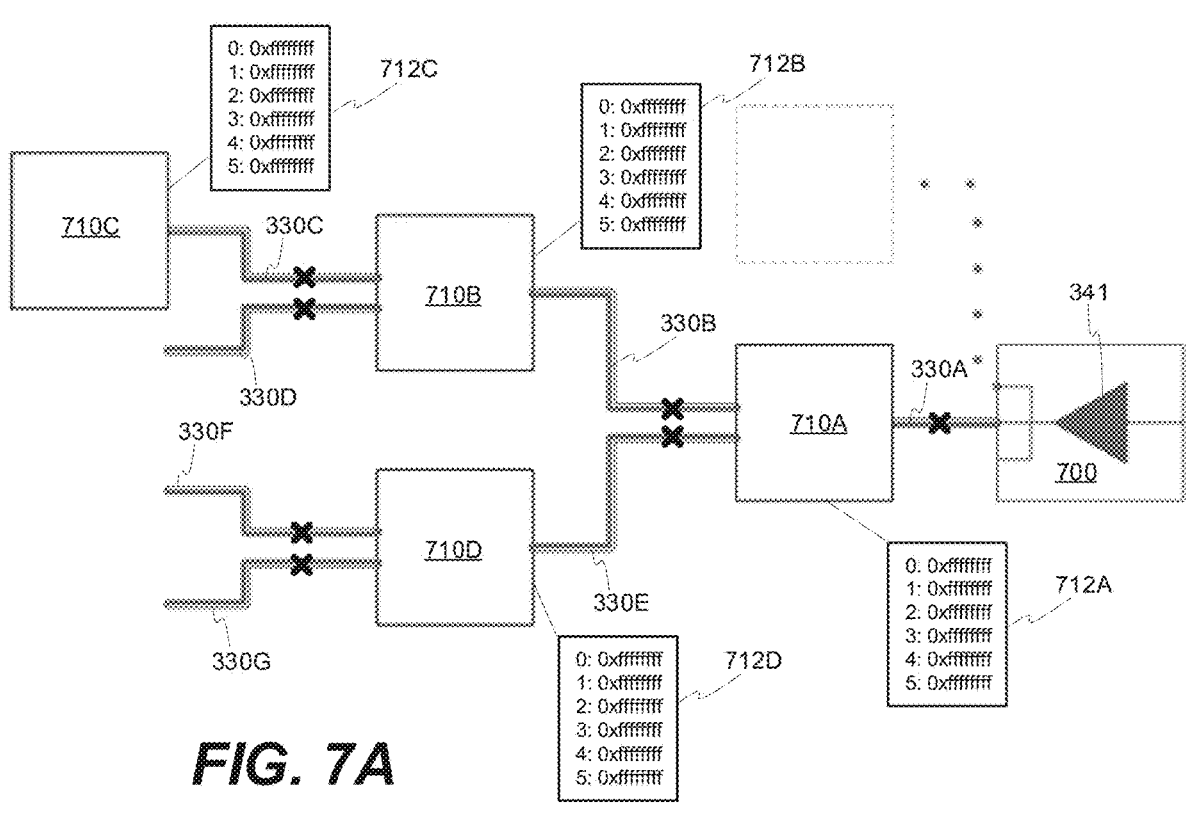
FIGS. 7A-7D depict an example device enumeration per the enumeration process of FIG. 6

FIG. 7A depicts the slave devices 710A-710D after reaching an initial state. As explained above with regard to 610 of process 600, in the initial state, pass-through buffers (e.g., buffers 340) of the slave devices 710A-710D, and other external and/or discrete buffers (e.g., buffers 341) are disabled. As such, all serial bus paths or serial bus segments 330A-330G between master device 700 and slave devices 710A-710D are disabled or closed as shown by the 'X' symbols FIG. 7A. Moreover, the address registers 712A-712D of each slave device 710A-710D have been reset to a predefined reset value (e.g., 0×ffffffff) representative of an uninitialized address.

Figure 7B:
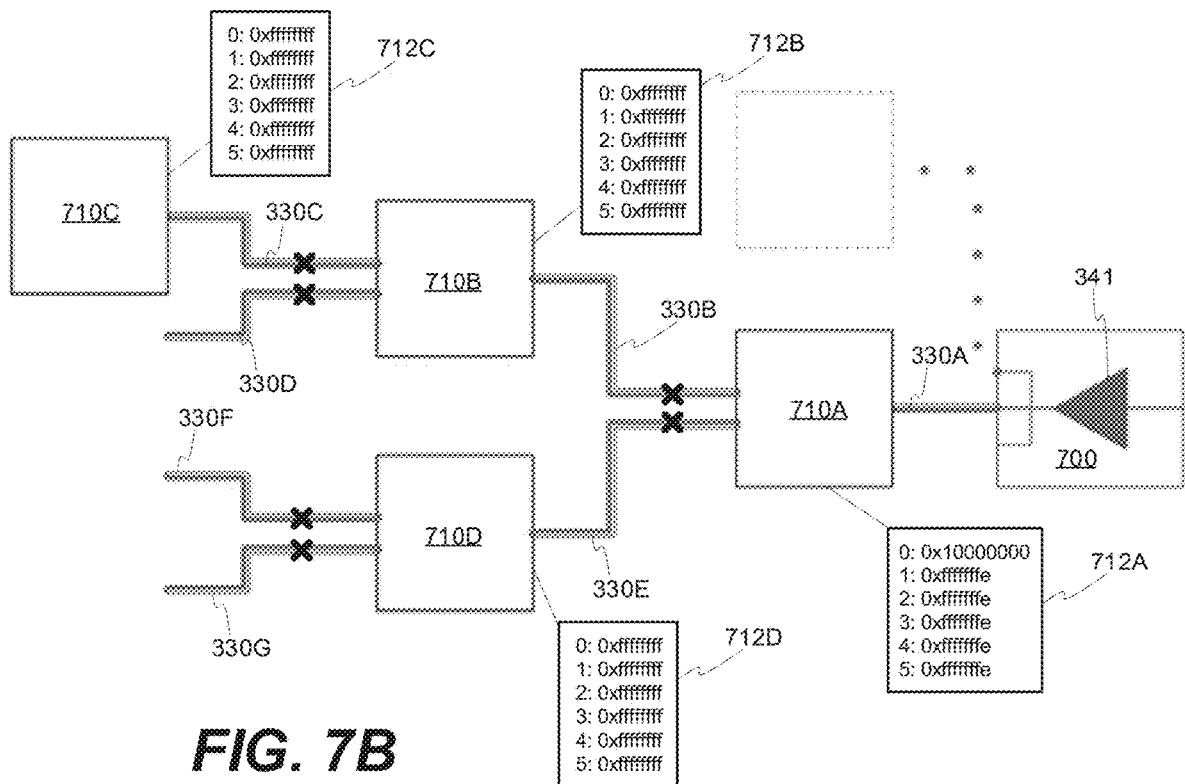

FIG. 7B depicts the slave devices 710A-710D after the path 330A between slave device 710A and the master device 700 has been opened and a write register command has been sent to the slave device 710A. In particular, the DevID field of the write register command was set to the predefined reset value 0×ffffffff, which matched at least one address of the slave device 710A. As such, the slave device 710A wrote values specified by the write register command to its address registers 712A. As shown, the slave device 710A wrote a unicast address of 0×1000000 to a single address register and wrote the same multicast address of 0×fffffffe to its remaining address registers.

Figure 7C:
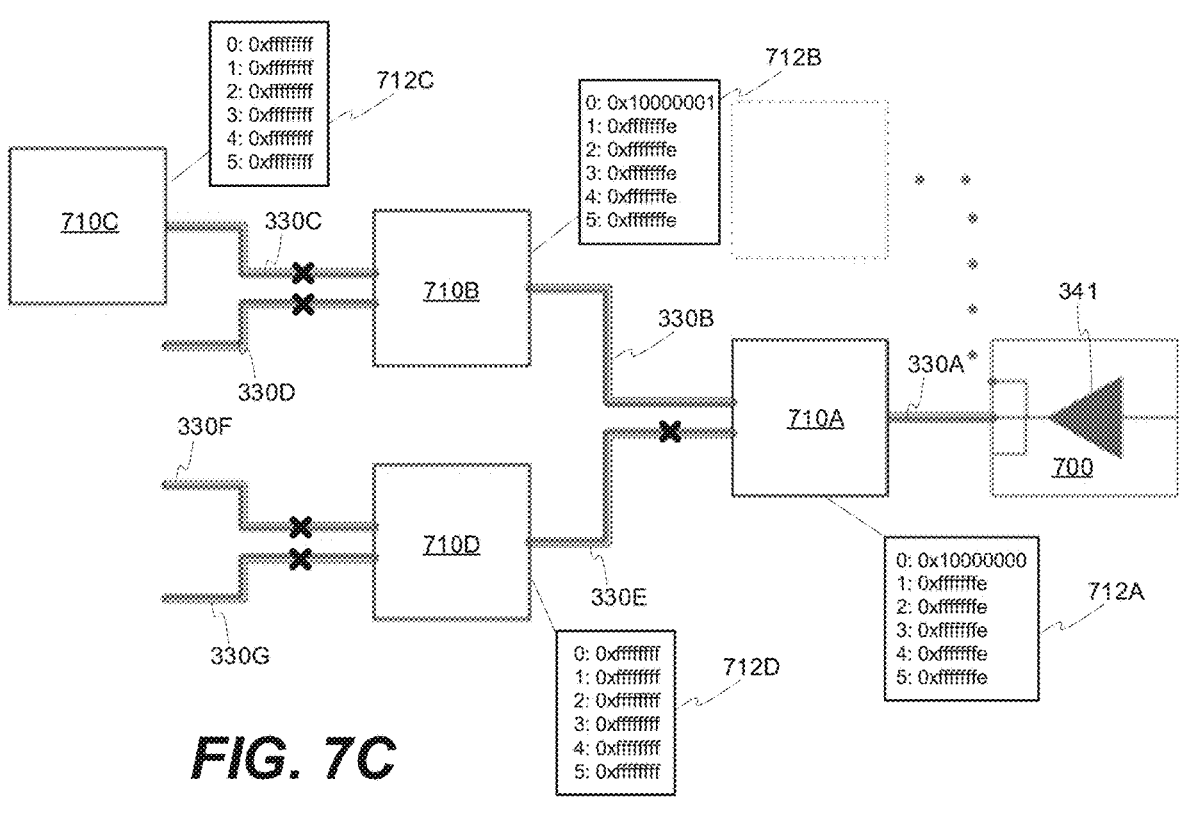

FIG. 7C depicts the slave devices 710A-710D after the next path has been opened, namely the path 330B between slave devices 710A and 710B. Moreover, the master device 700 has issued another write register command using the predefined or uninitialized address (e.g., 0×ffffffff). Since the address of this write register command does not match one of the addresses assigned to the slave device 710A, the slave device 710A essentially ignores the write register command. However, the address does match at least one of the addresses of slave device 710B. As such, the slave device 710B writes values specified by the write register command to its address registers. As shown, the slave device 710B wrote a unicast address of 0×1000001 to a single address register and wrote the same multicast address of 0×fffffffe to its remaining address registers.

Of note, slave device 710A now has a unicast address that is different than any other address assigned to slave devices 710A-710D. Similarly, slave device 710B now has a unicast address that is different than any other address assigned to slave devices 710A-710D. Moreover, slave devices 710A and 710B both include the same multicast address of 0×fffffffe. Thus, at this point, the master device 700 may uniquely address each of the slave device 710A and 710B via their assigned unicast addresses. Conversely, the master device 700 may effectively send or multicast the same command to both slave devices 710A and 710B by issuing a single command on the serial bus that has the multicast address assigned to both slave devices 710A and 710B.

Figure 7D:
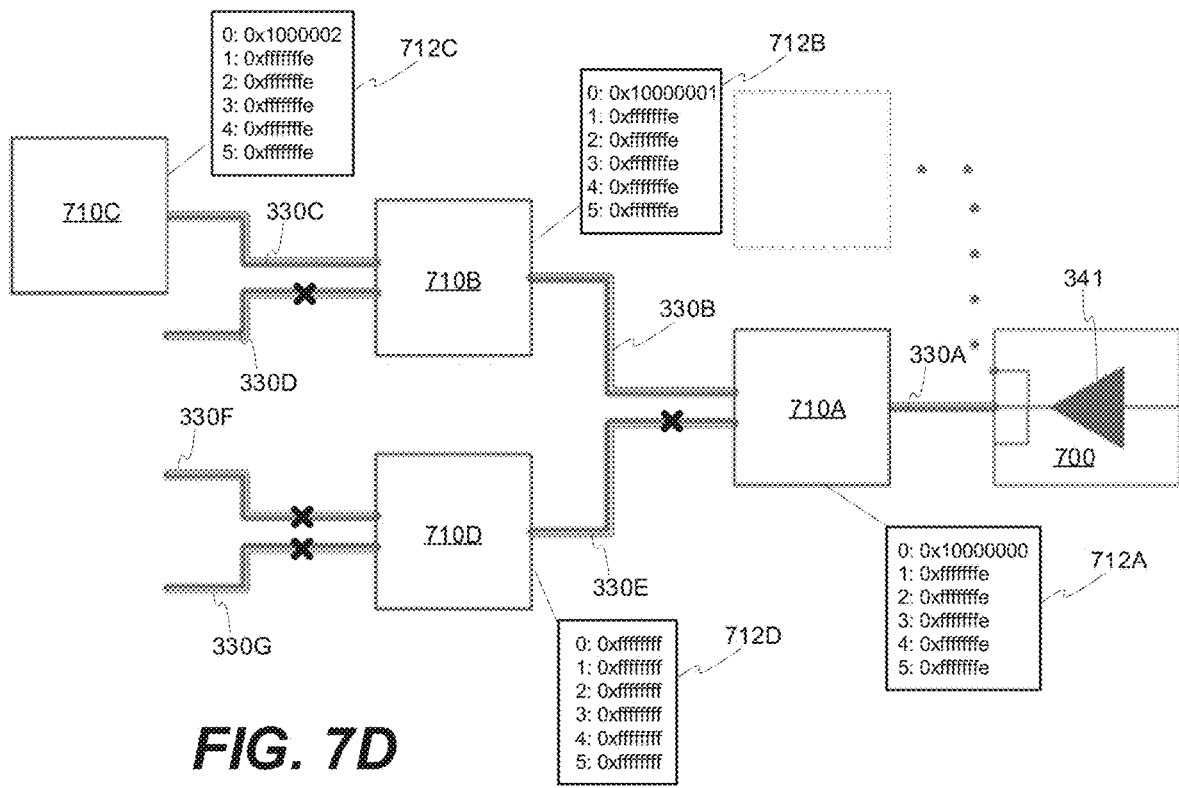

FIG. 7D depicts the slave devices 710A-710D after the next path has been opened, namely the path 330C between slave devices 710B and 710C. Moreover, the master device 700 has issued another write register command using the predefined or uninitialized address (e.g., 0×ffffffff). Since the address of this write register command does not match one of the addresses assigned to either slave device 710A or slave device 710B, the slave devices 710A and 710B essentially ignore the write register command as it propagates through the slave devices 710A and 710B. However, the address does match at least one of the addresses of slave device 710C. As such, the slave device 710C writes values specified by the write register command to its address registers. As shown, the slave device 710C wrote a unicast address of 0×1000002 to a single address register and wrote the same multicast address of 0×fffffffe to its remaining address registers. Thus, the master device 700 may now uniquely address each of the slave devices 710A-710C via their assigned unicast addresses or multicast a command to the slave devices 710A-710C via their assigned multicast address.

The above process of opening the next path and configuring the unicast and multicast addresses of the newly reached slave device may be recursively executed so as to enumerate each of the slave devices in the tree topology. Moreover, FIGS. 7A-7D depicts a depth-first approach to traversing the tree topology and enumerating the slave devices 710A-710D. However, other embodiments may utilize a breadth-first or another approach to traversing the network and enumerating the slave devices 710A-710D.

Figure 8:
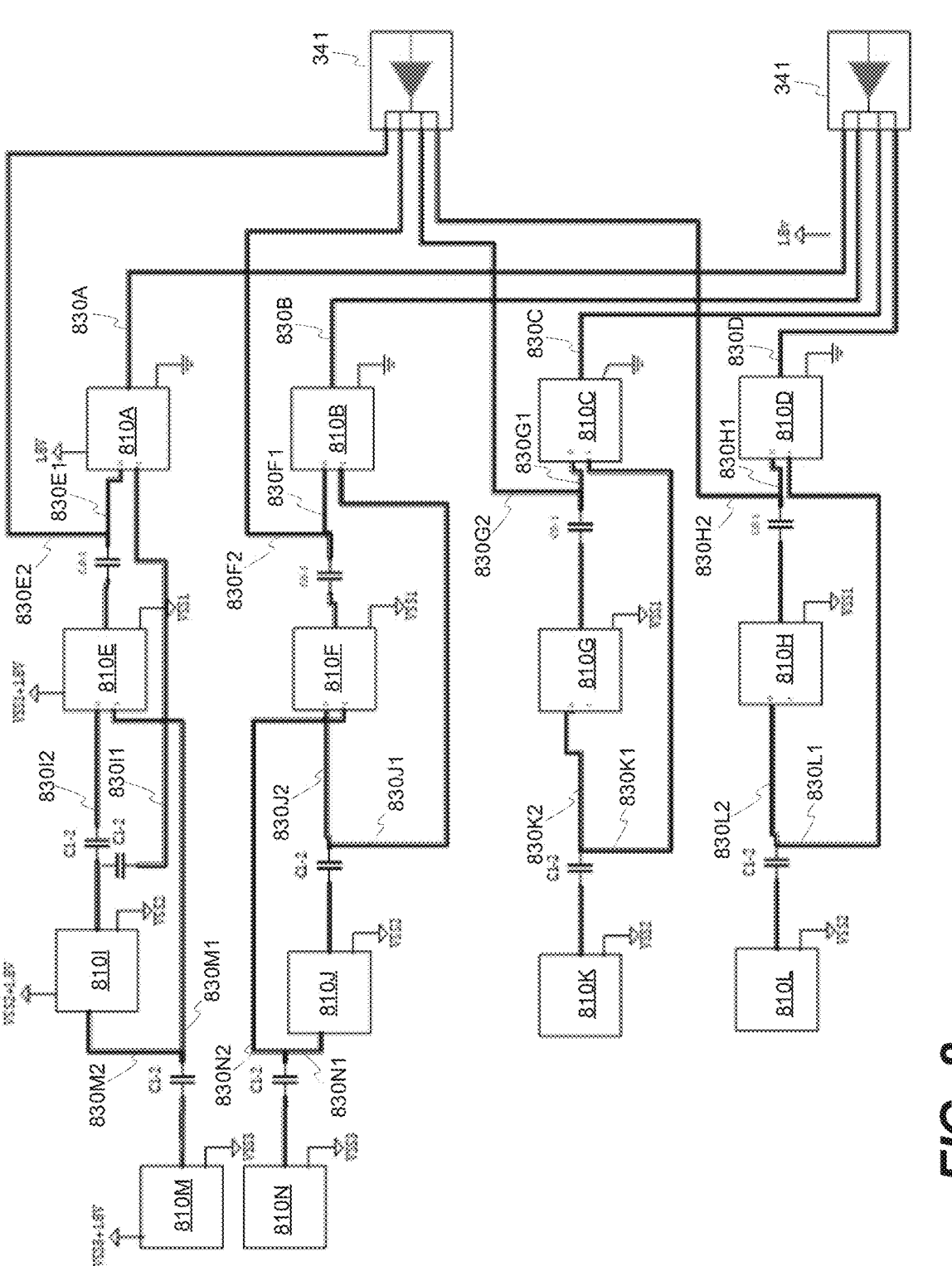
FIG. 8 shows a fault-tolerant topology for coupling slave devices such as the compute modules of FIG. 2 to a master device such as the miner controller of FIG. 2.

Referring now to FIG. 8, a fault-tolerant topology of slave devices 810A-810N is shown. In particular, slave devices 810A-810N may be coupled to a master device via one or more discrete buffers 341. Furthermore, second-level and/or deeper slave devices 810E-810N may be coupled to the master device via multiple serial bus paths or segments. For example, the upstream ports of slave device 810E are coupled to downstream ports of slave device 810A via bus segment 830E1. Moreover, the upstream ports of slave device 810E are further coupled to a discrete buffer 341 via a bus segment 830E2. Accordingly, if slave device 810A malfunctions, the miner controller 210 may disable, power-down, etc. the malfunctioning slave device 810A without affecting the operation of slave device 810E since slave device 810E may continue to communicate with the master device via the bus segment 830E2. Moreover, slave devices 8101 and 810M may continue to operate since they also can continue to communicate with the master device via the bus segment 830E2.

As shown, the fault-tolerant topology of FIG. 8 may include multiple bus segments 830E1-830N1, 830E2-830N2 respectively coupled between the second level and deeper slave devices 810E-810N. Moreover, the fault-tolerant topology may include one or more capacitors C0-1, C1-2 which provide an AC coupling between respective slave devices 810A-810N. In this manner, the fault-tolerant topology may permit continued operation of the compute boards 220 even if a subset of the compute modules 222 are malfunctioning or communications with a subset of compute modules 222 is unreliable.

While the foregoing has been described with reference to certain aspects and examples, those skilled in the art understand that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular examples disclosed, but that the disclosure includes all examples falling within the scope of the appended claims.

What is claimed is:
1. A cryptocurrency miner, comprising:
a controller;
compute modules; and
a serial bus comprising bus segments that couple the compute modules to the controller;
wherein a first compute module comprises upstream ports, downstream ports, a pass-through buffer that couples the upstream ports to the downstream ports, and address registers that each default to a same predefined default address;

wherein the controller is configured to open a first path of one or more bus segments to the upstream ports of the first compute module and issue a plurality of first write commands to the first compute module via the opened first path;

wherein each of the plurality of first write commands is directed to the predefined default address;

wherein the plurality of first write commands provides a non-default address for each address register of the first compute module; and wherein the first compute module is configured to write each non-default address provided by the plurality of first write commands to a respective address register in response to the first compute module determining that the plurality of first write commands are directed to an address stored by at least one address register of the first compute module.

2. The cryptocurrency miner of claim 1, wherein:

each first write command comprises a non-default address for each a respective address register of the first compute module; and the first compute module is configured to write each non-default address of the first write command to its respective address register.

3. The cryptocurrency miner of claim 1, wherein the non-default address provided by at least one of the plurality of first write commands is a unicast address for the first compute module.

4. A cryptocurrency miner, comprising:

a controller:

compute modules; and a serial bus comprising bus segments that couple the compute modules to the controller:

wherein a first compute module comprises upstream ports, downstream ports, a pass-through buffer that couples the upstream ports to the downstream ports, and address registers that each default to a same predefined default address:

wherein the controller is configured to open a first path of one or more bus segments to the upstream ports of the first compute module and issue a first write command to the first compute module via the opened first path;

wherein the first write command is directed to the predefined default address and provides a non-default address for an address register of the first compute module;

wherein the first compute module is configured to write the non-default address provided by the first write command to the address register of the first compute module in response to the first compute module determining that the first write command is directed to an address stored by at least one address register of the first compute module;

wherein a second compute module comprises upstream ports, downstream ports, a pass-through buffer that couples its upstream ports to its downstream ports, and address registers that each default to the same predefined default address as the address registers of the first compute module;

wherein the controller is configured to open a second path of one or more bus segments to the upstream ports of the second compute module and issue a second write command to the second compute module via the opened second path;

wherein the second write command is directed to the predefined default address and provides a non-default address for an address register of the second compute module; and wherein the second compute module is configured to write the non-default address provided by the second write command to the address register of the second compute module in response to the second compute module determining that second write commands is directed to an address stored by at least one address register of the second compute module.

5. The cryptocurrency miner of claim 4, wherein the non-default address provided by at least one of the plural of first write command is a multicast address for a subset of the compute modules.

6. The cryptocurrency miner of claim 4, wherein the controller opens the second path after opening the first path and issuing the first write command.

7. The cryptocurrency miner of claim 4, wherein the second path includes the opened first path and passes through the upstream ports, the pass-through buffer, and the downstream ports of the first compute module.

8. A cryptocurrency miner, comprising:

a controller; and a compute boards;

wherein each compute board comprises a compute board interface, compute modules, and bus segments that couple the compute modules to the controller via its respective compute board interface;

wherein each compute module comprises upstream ports, downstream ports, a pass-through buffer that couples its upstream ports to its downstream ports, and address registers that each default to a same predefined default address;

wherein the controller is configured to open, for each computed module, a respective path of one or more bus segments to the upstream ports of the respective compute module and issue a plurality of write commands to the respective compute module via its respective opened path;

wherein the plurality of write commands issued to a respective compute module and received by the respective compute module via its respective open path provides a non-default address for each address register of the respective compute module; and wherein each compute module is configured to write the non-default addresses provided by the plurality of write commands received via its respective opened path to its respective address registers in response to the respective compute module determining that the plurality of write commands is directed to its predefined default address stored by at least one of its respective address registers.

9. The cryptocurrency miner of claim 8, wherein:

each write command of the plurality of write commands received by each compute module comprises a non-default address for a respective address register of the respective compute module; and each compute module is configured to write the non-default addresses to their respective address registers.

10. The cryptocurrency miner of claim 8, wherein the non-default address provided by at least one of the write commands received by each compute module is a unicast address for the respective compute module.

11. The cryptocurrency miner of claim 8, wherein the non-default address provided by at least one of the write commands received by each compute module is a multicast address.

12. A method of a cryptocurrency miner, the method comprising:

opening a first path of one or more bus segments to a first compute module of the cryptocurrency miner;

issuing a plurality of first write commands to the first compute module via the opened first path; and writing non-default addresses provided by the plurality of first write commands to respective first address registers of the first compute module in response to the first compute module determining that the plurality of first write commands is directed to a predefined default address of at least one of the address registers of the first compute module.

13. The method of claim 12, comprising initializing each address register of the first compute module to the predefined default address.

14. The method of claim 12, comprising writing a non-default address to each address register of the first compute module in response to the first compute module receiving the plurality of first write commands.

15. The method of claim 12, wherein writing the non-default address to the first address register comprises writing a unicast address to the first address register.

16. The method of claim 12, wherein writing the non-default address to the first address register comprises writing a multicast address to the first address register.

17. The method of claim 12, comprising:

opening a second path of one or more bus segments to a second compute module;

issuing a second write command to the second compute module via the opened second path; and writing a second non-default address provided by the second write command to a second address register of the second compute module in response to the second compute module determining that the second write command is directed to the predefined default address of at least one of the address registers of the second compute module.

* * * * *